June 17, 1969  C. F. DIMMIG  3,449,937
HIGH PRESSURE FUEL LINE HEADS AND THE LIKE
Filed June 23, 1967
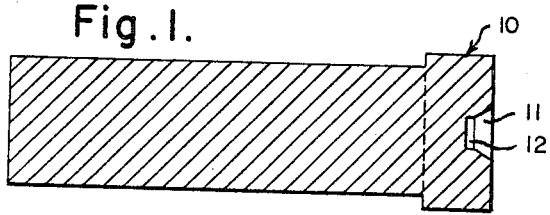
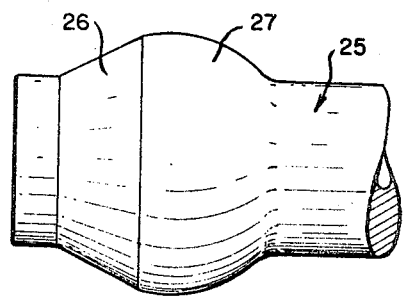
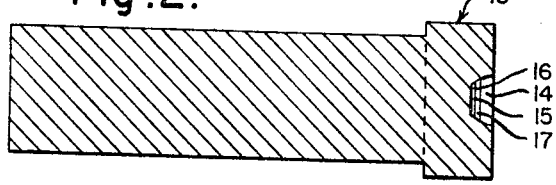
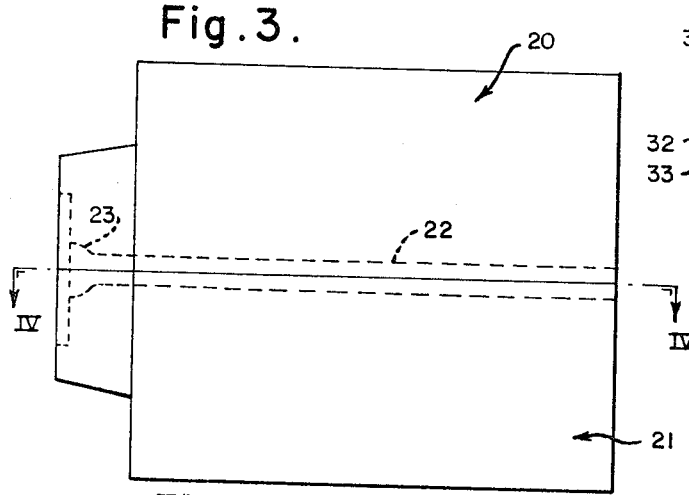
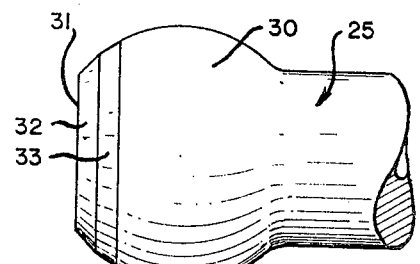
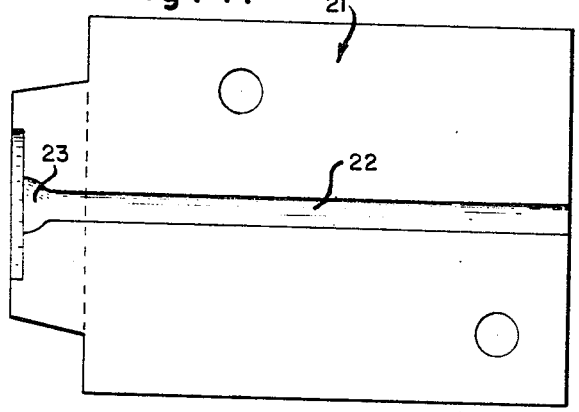
INVENTOR
Clarence F. Dimmig 3,449,937
HIGH PRESSURE FUEL LINE HEADS AND
THE LIKE
Clarence F. Dimmig, Pittsburgh, Pa., assignor, by mesne
assignments, to Columbia-Summerill Corporation, Pittsburgh, Pa., a corporation of Delaware
Filed June 23, 1967, Ser. No. 648,432
Int. Cl. B21d 11/04; B21c 37/06; F16l 9/22
U.S. Cl. 72—318                                                5 Claims

ABSTRACT OF THE DISCLOSURE

A fuel line head comprising a spherical enlargement ending in intersecting frusto-conical surfaces formed by a two-step cold forging process.

---

This invention relates to high pressure fuel line heads and the like and particularly to fuel line heads for delivering disel fuel from the injector to the cylinder of a diesel fuel engine.

The common practice in the past, in delivering diesel fuel from the injectors to the cylinder, has been to pass the fuel through thick-walled tubes bent to fit the particular engine contour and fitted at each end with a pressure connection of some sort. The most popular connection is in the form of a generally spherical copper or brass head which is slid onto the end of the tube and soldered or brazed in place. Such fittings generally have an axially extending shoulder which aligns them for brazing or soldering. This type of fitting, while being the most popular fuel line end now used, is subject to many problems and difficulties. It is virtually impossible to make a joint unless the head of the line and the opening into which it is to be inserted are in perfect alignment. Even the smallest misalignment sets up stresses which prevent the formation of a good joint and result in a failure of the joint. This then requires that every fuel line be adjusted on the job to the particular fittings into which it is inserted. Since diesel fuel lines are of very heavy walled steel tubing and are pre-bent to fit the particular motor in question, this is a difficult and frequently unsatisfactory practice.

The present invention provides a form of high pressure head on the fuel lines of the type above discussed which eliminates the problems pointed out herein and provides a stress free connection. Being stress free, the lines incorporating the present invention may be reused many times without damage to the head or to the lines.

In a preferred embodiment of the present invention there is provided a method of forming a high pressure diesel fuel line comprising the steps of (a) cold forming an integral enlargement on a heavy walled tube adjacent one end and spaced slightly from said one end, said enlargement being frusto-conical at the side adjacent said one end and substantially hemispherical on the opposite side, and (b) cold forming the enlargement and said one end into a generally spherical shape with the tube end forming a chordal plane transverse to the axis of the tube and bounded by two frusto-conical surfaces, the one adjacent the chordal plane being of greater included angularity than the one next adjacent thereto. This method is practically applied by holding the end of a heavy walled tubing in a die having a substantially hemispherical recess surrounding the end of the tube and swaging the end of the tube with a punch having a frusto-conical opening whose base equals the diameter of the hemisphere in the die and whose apex has an opening receiving a short length of tube end and then reswaging the enlargement and the tube end into a substantially spherical shape having a chordal plane formed by the end of the tube transverse to the tube axis and bounded by two successive frusto-conical surfaces, the one adjacent to the plane being of greater angularity than the one next adjacent the plane. The swaging is preferably done by punches having an opening corresponding to one-half of the desired enlargement.

In the foregoing general description, certain objects, purposes and advantages of this invention have been pointed out. Other objects, purposes and advantages will be apparent from a consideration of the following description and the accompanying drawings in which:

FIGURE 1 is a cross-sectional view of a first stage punch according to the invention;

FIGURE 2 is a cross-sectional view of a second stage punch according to the invention;

FIGURE 3 is a side elevational view of the two halves of the holding die of this invention;

FIGURE 4 is an elevational view of the holding die of FIGURE 3 taken in the direction of the arrow in FIGURE 3;

FIGURE 5 is a side elevational view of a first stage tube enlargement according to the invention; and FIGURE 6 is a side elevational view of the final head formed on a fuel line.

Referring to the drawings, there is illustrated a first stage punch 10 having a frusto-conical recess 11 and a short cylindrical recess 12 at the apex of said frusto-conical recess. A second stage punch 13 is provided with a generally hemispherical recess 14 having a chordal plane 15 cut therethrough whose diameter is the diameter of a tube to be enlarged. The chordal plane 15 is bounded by a frusto-conical surface 16 which in turn is bounded by a frusto-conical surface 17 of smaller angularity.

A pair of die members 20–21 are adapted to be brought together to hold a tube within an elongated passage 22 formed between them and terminating in a recess 23 of hemispherical configuration whose diameter is the diameter of the hemispherical recess 14 in punch 13.

A fuel line 25 of heavy walled steel is placed in passage 22 with an end projecting through recess 23. The first stage punch is forced against the projecting end to form a head thereon as shown in FIGURE 5. The head is frusto-conical at portion 26 and hemispherical at portion 27. The head is then forced into the recess 14 of head 13 and a final head 30 as shown in FIGURE 6 is formed of generally spherical shape having a chordal plane 31 transverse to the axis of the tube and bounded by a frusto-conical surface 32 which is in turn bounded by a frusto-conical surface 33 of lesser angularity. Preferably the angle of the frusto-conical surface 32 is derived from a 90° cone and the surface 33 from a cone of 48° to 58°.

In the foregoing specification, certain preferred practices and embodiments of this invention have been illustrated and described, however, it will be understood that this invention may be otherwise embodied within the scope of the following claims.

I claim:

1. The method of forming a high pressure diesel fuel line head comprising the steps of:
    (a) cold forming an enlargement on a heavy walled tube adjacent one end and spaced slightly from said one end, said enlargement being frusto-conical at the side adjacent said one end and substantially hemispherical on the opposite side, and
    (b) cold forming the enlargement and said one end into a generally spherical shape with the tube end forming a chordal plane transverse to the axis of the tube and bounded by two frusto-conical surfaces, the one adjacent the chordal plane being of greater included angularity than the one next adjacent thereto.

2. The method as claimed in claim 1 wherein the finished frusto-conical surfaces bounding the chordal plane are derived from about a 90° cone in the case of the surface adjacent the plane and about 48° to 58° in the case of the next adjacent surface.

3. The method as claimed in claim 1 wherein the diameter of the final sphere is equal to the diameter of the first formed hemispherical surface.

4. The method of forming a high pressure diesel fuel line head comprising the steps of:
   (a) holding a heavy walled tube adjacent one end in a die having a substantially hemispherical recess surrounding the end of the tube,
   (b) applying a punch under pressure to the end of said tube in said die, said punch having a frusto-conical opening whose base diameter equals the diameter of the hemispherical recess in the die and whose apex has an opening corresponding to a short section of the said tube to form an enlargement on said tube corresponding to the recesses in the die and punch, and
   (c) applying a second punch to the end of the said tube in said die, said punch having an opening in the form of a truncated hemisphere having a flat cordal plane transverse to the axis of the tube and substantially equal in diameter to the diameter of said tube, said plane being bounded by two frusto-conical surfaces, the one adjacent the chordal plane being of greater included angle than the one next adjacent thereto whereby said enlargement on said tube is cold formed to correspond to the recesses in said die and punch.

5. The method as claimed in claim 4 wherein the frusto-conical surface adjacent the chordal plane is derived from a cone of about 90° and the next adjacent frusto-conical surface from a cone of about 48° to 58°.

References Cited

UNITED STATES PATENTS

| | | | |
|---|---|---|---|
| 430,539 | 6/1890 | Parmelee | 72—370 |
| 2,227,820 | 1/1941 | Bratz | 72—318 |
| 2,268,246 | 12/1941 | Dooley | 72—367 |

CHARLES W. LANHAM, *Primary Examiner.*

LOWELL A. LANHAM, *Assistant Examiner.*

U.S. Cl. X.R.

72—367, 373; 138—109